March 16, 1926.
J. W. BISHOP
1,576,642
MOLDING DIE
Filed April 20, 1923
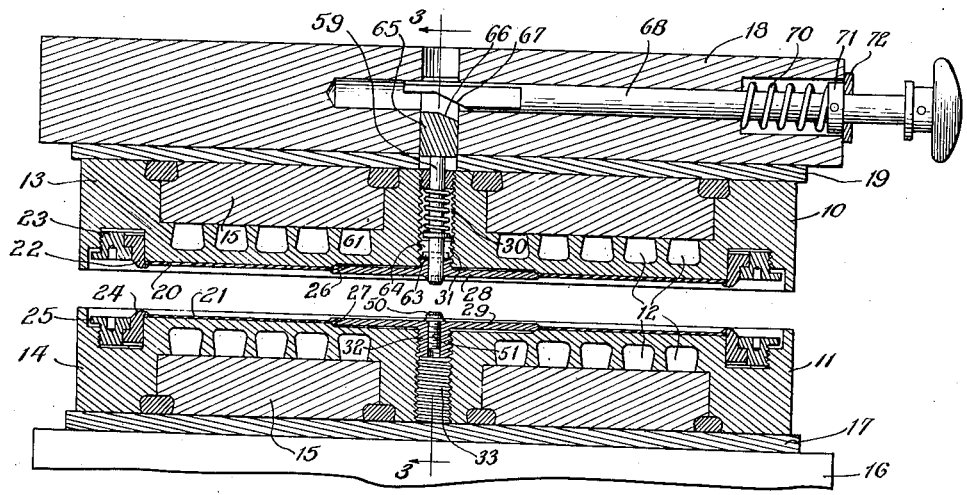
Fig. 1
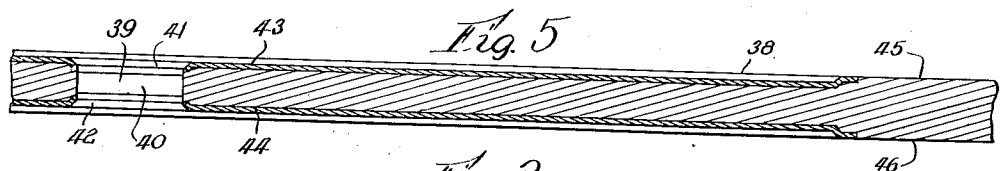
Fig. 5
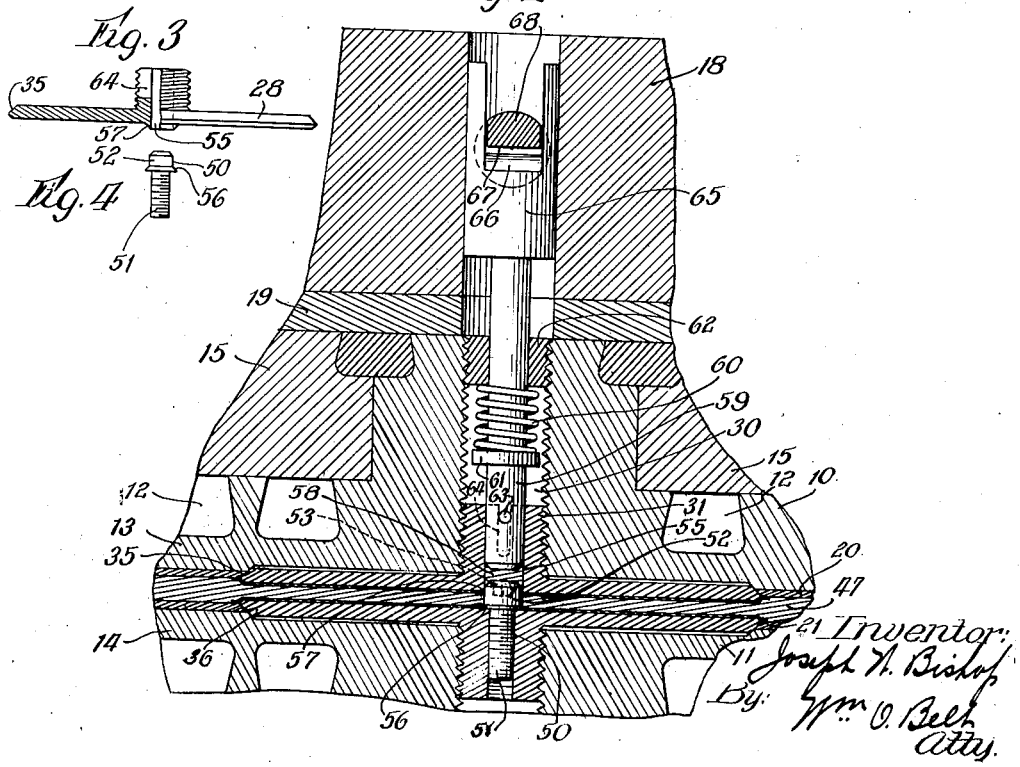
Fig. 2
Fig. 3
Fig. 4
Inventor:
Joseph W. Bishop
By Wm. O. Bell
Atty.

Patented Mar. 16, 1926.

1,576,642

UNITED STATES PATENT OFFICE.

JOSEPH W. BISHOP, OF MUSKEGON, MICHIGAN, ASSIGNOR TO THE BRUNSWICK-BALKE-COLLENDER COMPANY, OF WILMINGTON, DELAWARE, A CORPORATION OF DELAWARE.

MOLDING DIE.

Application filed April 20, 1923. Serial No. 633,642.

*To all whom it may concern:*

Be it known that I, JOSEPH W. BISHOP, a citizen of the United States, residing at Muskegon, in the county of Muskegon and State of Michigan, have invented certain new and useful Improvements in Molding Dies, of which the following is a specification.

The main object of my invention is to provide an improved molding die for the manufacture of phonograph records or the like which is especially adapted to be used in connection with a molding press, one type of which is shown and described in my co-pending application, Serial No. 622,838, filed March 5, 1923.

Other objects of my invention are to provide a molding die of the character described which has improved means for forming centering apertures in the phonograph records molded therein; which is adapted to mold centering apertures of improved form in the phonograph records, the centering apertures preferably resembling that shown and described in my co-pending application, Serial No. 633,463, filed under even date herewith; which has improved means for ejecting the completed product from the die; and in which the matrices are secured to the die members by improved means.

Other objects of my invention will become apparent as the detail description progresses, reference being had to the accompanying drawing, wherein—

Fig. 1 is a central section through a molding die for molding phonograph records of the disk type, the molding die thus shown embodying the novel features of my invention.

Fig. 2 is an enlarged fragmentary section taken on the same line as Fig. 1.

Fig. 3 is a side elevation, partly in section, of one of the matrices of my improved die.

Fig. 4 is a detail view of a punch member of my improved die, the punch member being adapted to form centering apertures of improved form in the phonograph records.

Fig. 5 is an enlarged section through a phonograph record, showing a centering aperture of improved form.

In the drawing, the reference characters 10 and 11 designate the upper and lower die members respectively of my improved molding die. Each of the die members 10 and 11 has a plurality of concentric channels 12, whereby the die may be alternately heated and cooled through the medium of heating and cooling fluids supplied to the die for a purpose and by means well known to those skilled in the art.

The channels 12 are formed in plates 13 and 14 of the upper and lower die members 10 and 11 respectively, each of the plates 13 and 14 being provided with a cover plate 15, which forms one wall of the channels 12. The lower member 11 of the die may be mounted upon the plunger of a hydraulic press, as indicated at 16, an asbestos pad 17 being interposed between the die and the plunger 15 to prevent loss of heat from the die by conduction. The upper member 10 of the die is shown secured to a platen 18 of the press, and heat insulated therefrom by an asbestos pad 19. For the purpose of this disclosure the platen 18 may be considered a part of the upper die member 10.

The upper and lower die members 10 and 11 are provided with matrices 20 and 21 respectively. The matrix 20 has its outer edge engaged by a clamping ring 22 which is adapted to hold the matrix 20 firmly in place upon the plate 13, a locking ring 23 which makes threaded engagement with the plate 13 serving to rigidly secure the clamping ring 22 to the plate 13. The lower die member 11 is also provided with a clamping ring, and a locking ring, as indicated at 24 and 25 respectively. The clamping ring 24 and the locking ring 25 cooperate to firmly hold the matrix 21 in place upon the plate 14. It will be noted that the clamping rings 22 and 24 are adapted to form the outer circular edges of the phonograph records, which may be molded in the die, for when a moldable compound is placed between the die members 10 and 11 and the die members are brought into pressing engagement as shown in Fig. 2, the clamping rings will be brought into close proximity.

Each of the matrices 20 and 21 is centrally apertured as at 26 and 27 respectively, the apertures having diameters substantially equaling those of a pair of label depressing disks 28 and 29. The label depressing disk 28 is associated with the plate 13, which is provided with a threaded hole 30 adapted to receive a threaded cylindrical boss 31 formed integrally with the label depressing disk 28. In a like manner a label depressing disk 29 is provided with a threaded cylindrical boss 32 for securing the disk 29 to the plate 14, the plate 14 having a threaded hole 33 adapted to receive the threaded boss 32. The label depressing disk 28 has a beveled edge 35 which engages the correspondingly beveled wall of the opening 26 in the matrix 20, and the label depressing disk 29 has a beveled edge 36 which engages the correspondingly beveled wall of the opening 27 in the matrix 21. It is readily understood that by reason of the interfitting engagement between each of the disks 28 and 29 and the matrices 20 and 21, respectively, together with the studs or bosses 31 and 32, the label depresing disks 28 and 29 serve to hold the central portions of the comparatively thin matrices 20 and 21 firmly in place against the plates 13 and 14 respectively.

In Fig. 5 I have shown an enlarged central section through a disk phonograph record, such as is shown and described in my aforementioned co-pending application of even date herewith, and which may be molded in my improved molding die. The record is designated in its entirety by the reference character 38 and is provided with a centering aperture 39 having a cylindrical surface 40. The cylindrical surface 40 is joined to the plane surfaces of the record by a plurality of frustro conical surfaces 41 and 42. It will be noted that portions of the frustro conical surfaces 41 and 42 are formed by parts of a pair of labels 43 and 44. The identifying labels 43 and 44 are similar to those usually affixed to phonograph records of the disk type. It is preferable, as shown, to have the major portion of each of the labels 43 and 44 depressed below its associated sound reproducing surface. Thus the major portion of the label 43 is depressed below the sound reproducing surface 45, and the major portion of the label 44 is depressed below the sound reproducing surface 46. The means for so depressing the labels 43 and 44 are, of course, the label depressing disks 28 and 29. The functions of the label depressing disks 28 and 29 are well illustrated in Fig. 2, in which figure the die members are shown in pressing engagement with a moldable compound between the members, as indicated at 47.

As means for forming the centering aperture 39 I provide the lower die member 11 with a punch pin 50. The punch pin 50 has a threaded shank 51, by means of which the punch pin is rigidly secured to the label depressing disk 29, the head portion 52 of the punch pin being provided with a socket 53 to admit insertion of a suitable tool when the punch pin is being threaded into the label depressing disk 29. The socket 53 is filled with solder, or the like, after the punch pin 50 has been properly secured to the label depressing disk 29.

The head 52 of the punch pin 50 is in alignment with and is adapted to enter an aperture 55 of the label depressing disk 28, a cylindrical surface of the head 52 snugly fitting within a similar surface of the aperture 55. This cylindrical surface of the head 52 is adapted to form the centering aperture 39 of the phonograph record 38 which may be molded from the moldable compound 47. The punch pin 50 is also provided with a beveled collar 56 to form the frustro conical surface 42 of the record 38, the frustro conical surface 41 of the record being formed by a bevel 57 turned upon the label engaging face of the disk 28. The bevel 57 is disposed concentrically with the aperture 55 of the label depressing disk 28 and is adapted to function as a cutting die when the head 52 of the punch pin 50 enters the aperture 55. As the die members 10 and 11 are brought into pressing engagement the punch pin 50 with the aid of the cutting edge of the bevel 57 will punch and cut out a button of the moldable compound, as is indicated at 58 in Fig. 2. The punch pin 50 forces the button 58 into the aperture 55, thereby displacing from its normal position an ejector pin 59, which has one end thereof slidably journaled in the label depressing disk 28. In its normal position the ejector pin 59 projects from the label engaging surface of the disk 28, it being yieldably held in this position by means of a helical compression spring 60, wound around the ejector pin 59. One end of the compresion spring 60 rests against a collar 61 turned upon the ejector pin 59, and the other end thereof rests against an apertured collar 62 threaded into the hole 30 of the plate 13. The apertured collar 62 serves to slidably journal the upper end of the ejector pin 59. A pin 63 rigidly secured in the ejector pin 59 has its ends riding in a slot 64 which is cut into the threaded cylindrical boss 31 of the label depressing disk 28. The pin 63 limits the downward movement of the ejector pin 59.

Supported by the ejector pin 59, and slidably journaled in the platen 18 is a block 65 having an inclined surface 66 which is adapted to be engaged by a similarly inclined surface 67 of a plunger 68 also slidably journaled in the platen 18. The plunger 68 is disposed at right angles to the ejector pin 59, and when in its normal position has its inclined surface 67 so disposed with respect to the inclined surface 66 of the block 65 that when the ejector pin 59 and the block 65 are moved upwardly during a molding operation, the inclined surface 66 of the block 65 will approach the inclined surface 67 of the plunger. The means for holding the plunger 68 in its normal position comprises a helical compression spring 70 wound around the plunger. The helical compression spring 70 has its inner end resting against the platen 18 and its outer end resting against a collar 71 which is pinned to the shaft, and which is also adapted to engage a stop 72 rigidly secured to the platen 18.

The helical compression spring 60, which is associated with the ejector pin 59, is designed to eject the button 58 if the button does not expand to such an extent as to actually sieze the wall of the aperture 55. In the event that the newly formed record tends to adhere to the matrix 20 when the dies are separated after a molding operation, the button, in attempting to pass through the centering aperture 39 of the newly formed record, will, as a general rule, remove the record from the matrix 20. But the compression spring 60 has not sufficient strength to actually tear the newly formed record from the matrix 20, as deformation of the still flexible record disk would then occur. However, the record disk rapidly stiffens, and it is apparent that the operator may push inwardly upon the plunger 68 so that its inclined surface 67 will engage the inclined surface 66 of the block 65, thus forcibly driving the block 65 and the ejector pin 59 downward. The button 58 and the newly formed record will then be displaced relative to the upper die member 10.

In the operation of the device, the operator first places the labels 43 and 44 in the die, the die members 10 and 11 having been spaced from each other to permit removal of the finished product of the last preceding operation. One of the labels is centered upon the ejector pin 59 and the other of the labels is centered upon the punch pin 50. A quantity of the moldable compound 47 which has been suitably prepared is then placed between the die members 10 and 11. The die members are brought into pressing engagement immediately by the mechanism of the molding press, of which they form a part. Any excess of moldable compound is squeezed out between the clamping rings 22 and 24, thus forming a fin which the operator must later remove. As the die members 10 and 11 are being brought out of pressing engagement by the mechanism of the molding press, the ejector pin 59 will usually function to eject the button 55 and to remove the newly formed record from the matrix 20 if it so happens that the newly formed record adheres to this matrix. But as has been explained hereinbefore, it may be necessary at times for the operator to actuate the ejector pin through the medium of the manually operated plunger 68. After the die members 10 and 11 have been brought to spaced positions, the operator removes the completed product and inserts the labels for the next operation.

I am aware that changes in the form, construction and arrangement of parts may be made without departing from the spirit and without sacrificing the advantages of the invention and I reserve the right to make all such changes as fairly fall within the scope of the following claims:

I claim:

1. In a die for molding phonograph records or the like, an ejector pin slidably journaled in the die, yielding means for holding the ejector pin in an extended position relative to the die, a manually operable plunger journaled in the die for actuating the ejector pin, and a second yielding means for holding the plunger in a retracted position.

2. In a die for molding phonograph records or the like, an ejector pin slidably journaled in the die, yielding means for holding the ejector pin in an extended position relative to the die, a manually operable plunger slidably journaled in the die for actuating the ejector pin, the axis of the plunger being disposed substantially normal to the axis of the ejector pin, and a second yielding means for holding the plunger in a retracted position.

3. In a die for molding phonograph records or the like, an ejector pin slidably journaled in the die, yielding means for holding the ejector pin in an extended position relative to the die, a block resting upon the ejector pin and slidably journaled in the die, a manually operable plunger for displacing the block to actuate the ejector pin, and a second yielding means for holding the plunger in a retracted position.

4. In a die for molding phonograph records or the like, an ejector pin slidably journaled in the die, yielding means for holding the ejector pin in an operative position relative to the die, a block associated with the ejector pin and having an inclined surface, a plunger having an inclined surface adapted to engage the inclined surface of the block for displacing the block to actuate the ejector pin, and yielding means for withdrawing the plunger from engagement with the block.

5. A die for molding phonograph records or the like comprising a pair of members adapted to be brought into pressing engagement, a punch rigidly secured to one member for forming a centering aperture in the record and adapted to enter an aperture in the other member, an ejector pin slidably journaled in the aperture of the other member, yielding means for holding the ejector pin in an extended position relative to the die, and manually operable means for actuating the ejector pin.

6. In a die for molding phonograph records or the like, a member having a punch projecting from its molding surface for forming centering apertures in the records, a second member having an aperture adapted to receive the moldable material displaced by the punch, an ejector pin slidably journaled in the aperture of the second member, yielding means tending to actuate the ejector pin, and separate manually operable means for actuating the ejector pin.

7. In a phonograph record die, the combination of a die member, a matrix therein having a central aperture provided with beveled walls, a label depressing member occupying said central aperture and having its periphery beveled and fitting the beveled walls in the opening in the matrix, said label depressing member projecting at the exposed face of the matrix, the periphery of the projecting portion of the label depressing member being beveled, and means for connecting the label depressing member with the die member.

8. In a phonograph record die, the combination of a die member having a screw threaded opening therein, a matrix having a central aperture concentric with the screw threaded opening in the die member and of greater diameter than said opening, the walls of the aperture in the matrix being beveled, and a label depressing member occupying the aperture in the matrix and having a beveled periphery fitting the beveled walls of the aperture in the matrix, said label depressing member projecting at the exposed face of the matrix, the periphery of the projecting portion of the label depressing member being beveled reversely with respect to the first mentioned beveled portion of said member, the label depressing member having a central screw threaded boss engaging the screw threaded opening in the die member.

9. In a molding die comprising a pair of members adapted to be brought into pressing engagement, a punch secured to one member and adapted to enter an aperture in the other member, the other member having a beveled surface adjacent the aperture forming a cutting edge adapted to cooperate with the punch.

10. In a phonograph record die, the combination of opposite die members, label depressing members carried by the die members, a punch carried by one of the label depressing members and provided with a beveled flange at the base thereof, the other label depressing member having an opening disposed to receive the punch and surrounded by a beveled annulus.

11. In a phonograph record die, the combination of opposite die members, centrally apertured matrices carried by the die members, a label depressing member occupying the aperture in each matrix and having a portion projecting at the exposed face of the matrix, means carried by each label depressing member for connecting the same with the adjacent die, there being an interengagement between each matrix and its label depressing member to secure the matrix to its die, a punch carried centrally by one of the label depressing members and provided with a beveled base at the exposed face of said label depressing member, the opposite label depressing member having an opening to receive the punch and provided with a beveled annulus surrounding said opening.

JOSEPH W. BISHOP.